United States Patent

Bacher et al.

[11] Patent Number: 5,643,450
[45] Date of Patent: Jul. 1, 1997

[54] FILTER APPARATUS FOR FLUIDS, IN PARTICULAR FOR THERMOPLASTIC SYNTHETIC PLASTICS MATERIAL FLUID

[76] Inventors: Helmut Bacher, Bruck/Hausleiten 17; Helmuth Schulz, Badstrasse 20, both of St. Florian, Austria, A-4490; Georg Wendelin, Waldbothenweg 84, Linz, Austria, A-4033

[21] Appl. No.: 495,617
[22] PCT Filed: Feb. 2, 1994
[86] PCT No.: PCT/AT94/00012
  § 371 Date: Aug. 2, 1995
  § 102(e) Date: Aug. 2, 1995
[87] PCT Pub. No.: WO94/17981
  PCT Pub. Date: Aug. 18, 1994

[30] Foreign Application Priority Data

Feb. 4, 1993 [AU] Australia ................................. 195/93
  Oct. 19, 1993 [AU] Australia ................................ 2105/93
  Oct. 19, 1993 [AU] Australia ................................ 2106/93

[51] Int. Cl.[6] .................................................. B01D 29/64
[52] U.S. Cl. ........................ 210/350; 210/407; 210/408; 210/413
[58] Field of Search ............................... 426/197, 199; 210/350, 407, 408, 413

[56] References Cited

U.S. PATENT DOCUMENTS

| 3,361,263 | 1/1968 | Street. |
| 4,657,636 | 4/1987 | Satomi. |

FOREIGN PATENT DOCUMENTS

| 411163 | 2/1991 | European Pat. Off.. |
| 1356496 | 2/1964 | France. |
| 2324581 | 5/1974 | Germany. |
| 2324581 | 12/1974 | Germany. |
| 2811771 | 5/1979 | Germany. |
| 3335949 | 4/1985 | Germany. |
| 640276 | 7/1950 | United Kingdom. |

Primary Examiner—W. L. Walker
Attorney, Agent, or Firm—Salter & Michaelson

[57] ABSTRACT

A filter apparatus for thermoplastic synthetic plastics material melts comprises a housing (2) in which two filter disks (5,6) are disposed in parallel to each other and spaced apart from each other. The melt to be filtered is supplied to these filter disks (5,6) via an upstream channel (19). The impurities gathering on the upstream side of the filter disks (5,6) are continuously scraped off by a scraper (8) that carries a plurality of scraper elements (10) disposed along curved lines spaced apart from each other so that they convey the impurities towards the center of the filter disks (5,6). There, the impurities reach a conveyance channel (22) in which they are conveyed off by at least one worm (23,24).

21 Claims, 5 Drawing Sheets

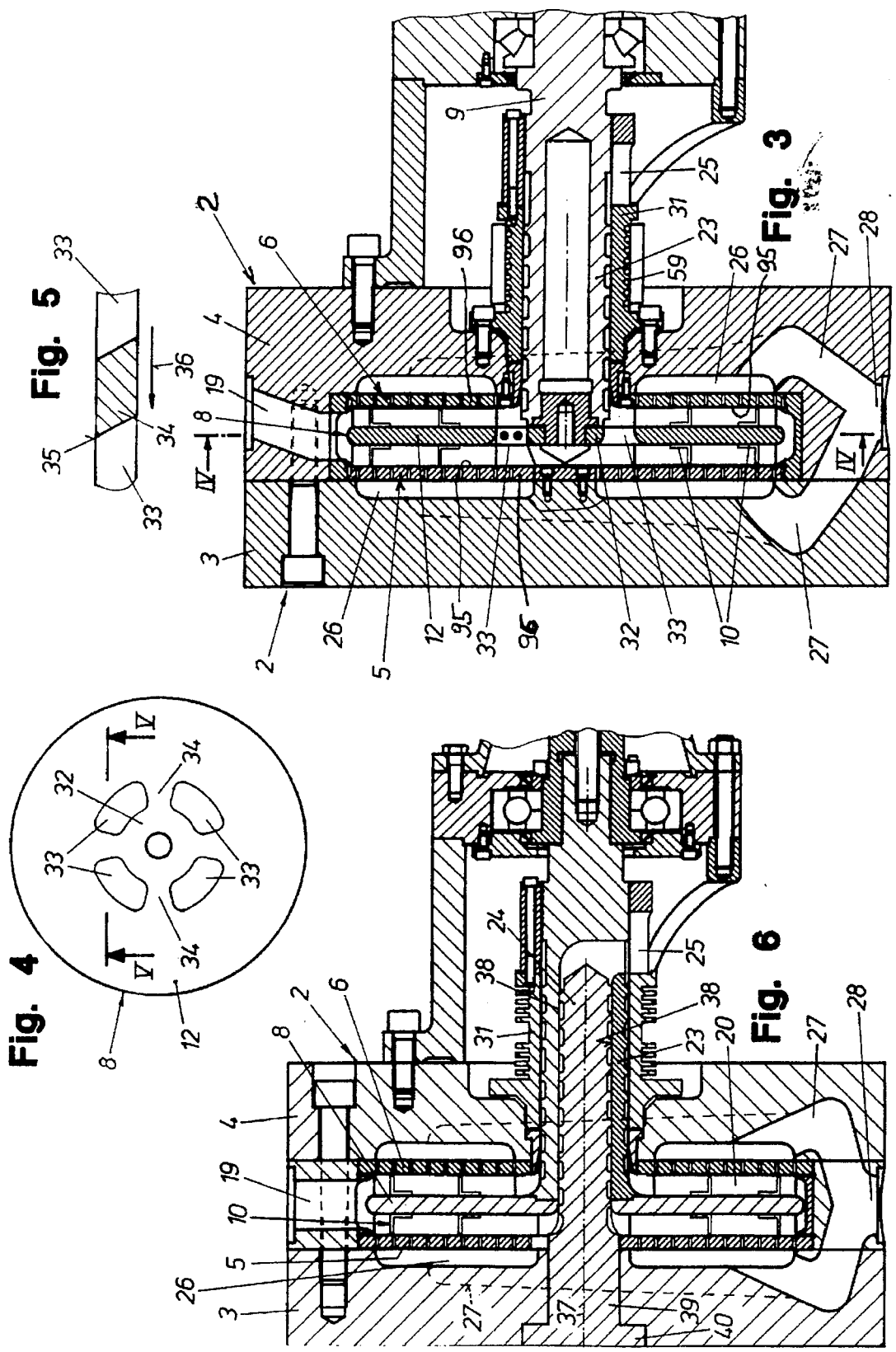

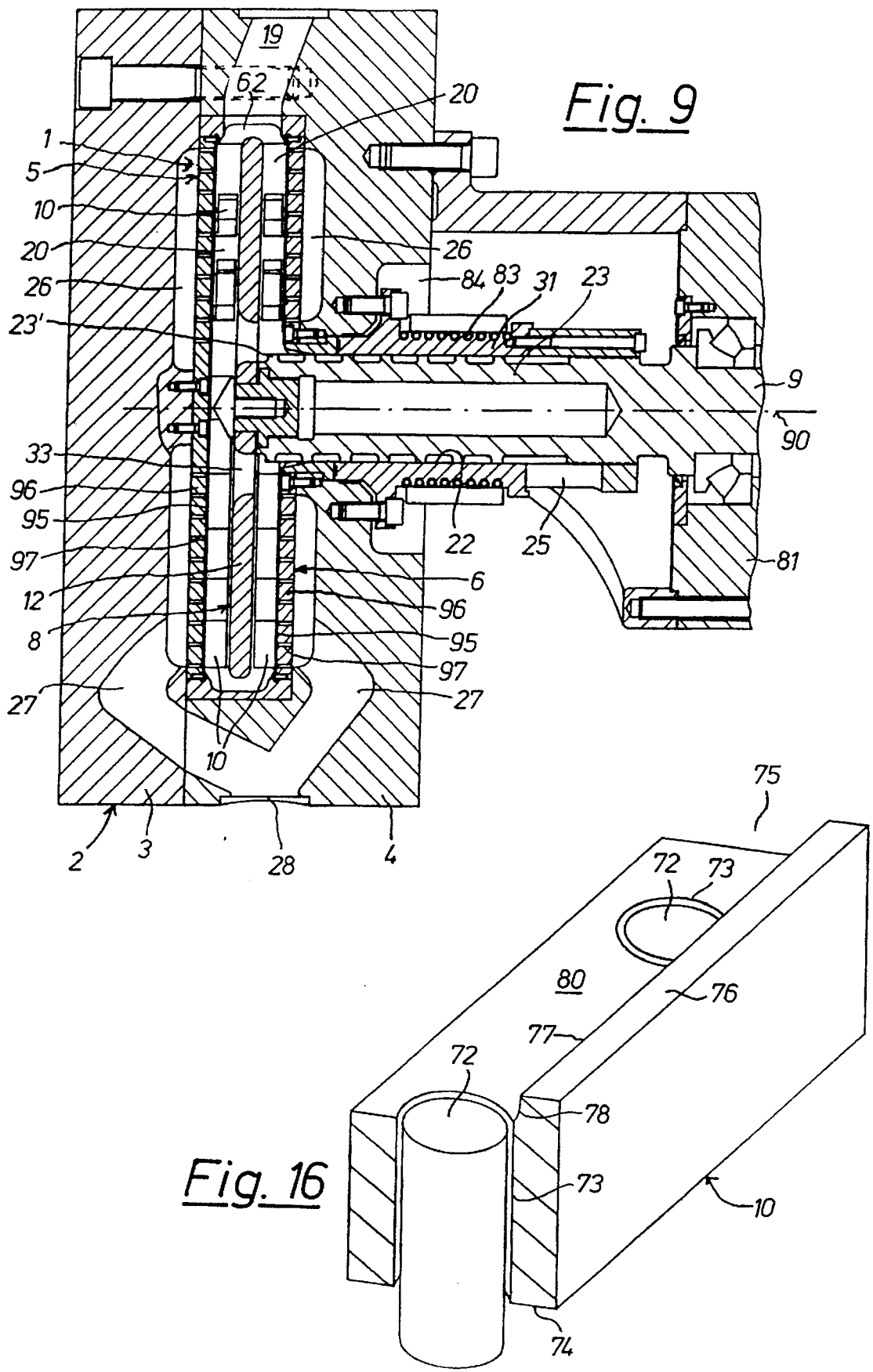

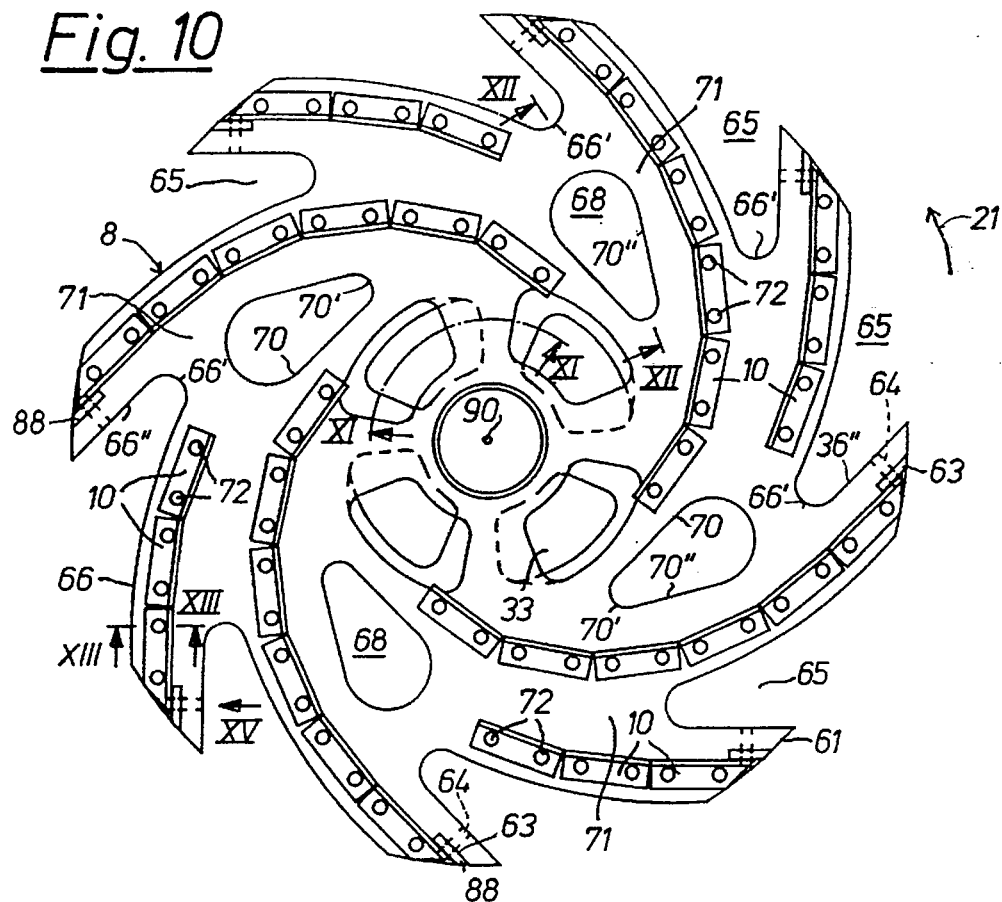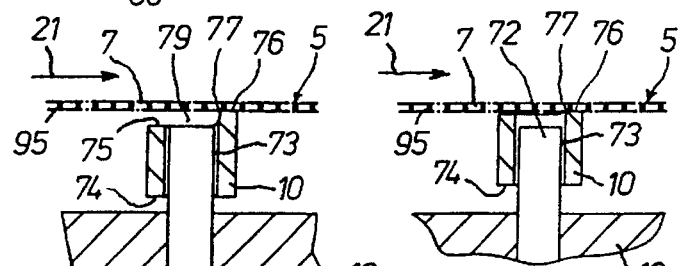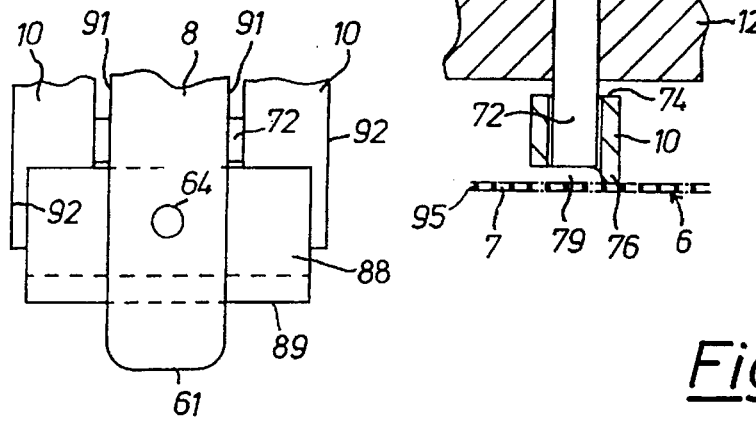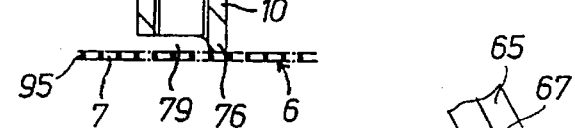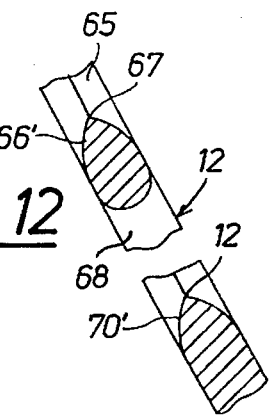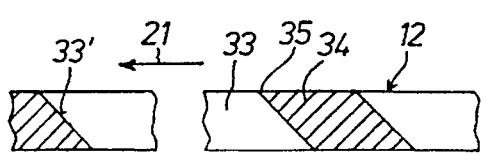

FILTER APPARATUS FOR FLUIDS, IN PARTICULAR FOR THERMOPLASTIC SYNTHETIC PLASTICS MATERIAL FLUID

This application is a 371 of PCT/AT94/00012, filed Feb. 2, 1994.

BACKGROUND AND SUMMARY OF THE INVENTION

The invention relates to a filter apparatus for fluids, in particular for thermoplastic synthetic plastics material fluid, with continuous cleaning of the surface of the filter, comprising a housing for a stationary, metallic, substantially planar filter to which the fluid to be filter is supplied through at least one upstream channel and from which the cleaned fluid is conducted off the housing through at least one downstream channel, at least one scraper provided with some scraping edges lying in a common plan and following curved lines, at least one drive means for rotation of the scraper so that the scraper strokes over the upstream surface of the filter and thereby strips off the impurities adhering thereon and carries them towards the center of the filter, wherefrom the impurities are conveyed off by at least one worm through at least one outlet channel extending from the center of the filter and leading out of the housing.

Filter apparatus for thermoplastic synthetic plastics fluid operating continuously in the most cases show as a filter a cylindric sleeve fixed in the housing (EP-A-411,163), which sleeve on its outside is surrounded by the scraper in form of a spiral band. This, inter alia, has the disadvantage the problems arise during assembly or disassembly, for example for service purposes, due to the length of the filter cylinder, in particular for bigger units. The filter sleeve consists of thin sheet metal and, therefore, is comparatively weak. When axially assembling or disassembling such a filter sleeve, deformations cannot be avoided, in particular due to the scraper that frictionally engages the filter sleeve. In order to ensure the necessary penetrability of the filter openings, these openings must show a greater diameter on the outside of the filter shell that at the inner side. Economically, such openings can only be produced by lasers, and this has a consequence that these bores are produced at the planar filter element which after production of the bores is rolled round and is welded at the location of the joint. This makes it difficult to obtain the necessary exactness. It is not possible to product the filter openings after rolling round the sleeve because the laser operators cannot be introduced into the sleeve. A further disadvantage consists in a lack of operation reliability. This results from that the spiral band, in dependency of its direction of rotation, tends either to jam at the filter sleeve or to surround it only loosely. In the first case there is at least the disadvantage of an increased power requirement in order to overcome the arising friction forces, and what is more, there is a breakdown of operation or a tearing of the filter element. In the second case, the scraper does no more sufficiently engage the filter and, therefore, cannot more reliably convey off the impurities that collect at the outside of the filter.

For this reason, it has been already proposed to provide a continuously operating filter apparatus with a planar sieve (DE-A-3,335,949, DE-A 2,324,581) and to construct it in the initially described or in a similar manner. However, it is of disadvantage within this construction, that it is suitable only for relative small throughputs. The reason for this is that the planar sieve plate used within this know construction tends to deformations under the pressure of the supplied fluid containing impurities, which pressure may amount to about 350 bar, so that the scraping edges of the scraper do not more exactly contact the surface of the sieve plate to be cleaned. Therefore, there is soon a soiling of the sieve plates and therefore a breakdown of operation. Similar disadvantages occur within further know apparatus in which stripper elements are disposed a small distance apart from the filter (GB-A 640,276) or in which instead of scrapers impellers are provided (U.S. Pat. No. 4,657,636). Restrained textile filters (FR-A 1,356,496) cannot be used for high pressures.

The invention has on its task, on the one hand to substantially increase the throughput in comparison to the know construction, and on the other hand to provide for a reliable cleaning of the filter. The invention solves this task by the features that the filter is constituted by at least two filter disks disposed in parallel to each other and spaced apart from each other, that the fluid is supplied through the upstream channel at the outer periphery of the filter disks, that the scraper acting upon both filter disks is disposed between the filter disks, each of the scraping edges of the scraper being formed by some scraper elements spaced from each other but disposed along the lines and being pressed onto the filter disks, and that collection spaces for the cleaned fluid are provided at the opposing sides of the filter disks, which collection spaces are connected with the downstream channel in the region of the outer periphery of the filter disks. The provision of two filter disks doubles the active filter surface without increasing the effort for upstream channels and downstream channels. To divide the scraping edges of the scraper into some scraper elements per line enables on to individually adapt these scraper elements to the deformations of the filter occurring during operation so that, in comparison to the lastly described known apparatus, cleaning of the filter is substantially improved and thereby the tool life is increased at a substantially increased throughput. The increased safe of cleaning of the two filter disks by the single scraper elements enables one also to substantially increase the active area of the filter disks in comparison to the lastly described known construction even if this increase has as a consequence that the filter disks are deformed under the pressure of the material to be filtered.

In comparison to the first described known construction there is the advantage that the planar filter disks can be produced in a substantially easier manner and thereby showing a greater exactness than a filter sleeve, because there is no rolling round. Thereby, also the assembly and disassembly of the filter into or out of the housing is facilitated, as well as mounting and demounting during service operation. Since there is no more a jamming of the scraper on the filter, also the reliability of operation is increased.

The supply of the material to be filtered from the outer periphery of the filter disks between them enables one also to dispose the upstream channel or the upstream channels radially with respect to the axis of the filter, and this also for the downstream channel for the filtered material or, respectively, for the downstream channels for same. Thereby, one is more independent in the disposition of the supply of the material to be filtered, when compared with the lastly described known construction, at which the supply must be made in axial direction of the filter so that the drive means for rotation of a damming member carrying the scraping edges must be disposed at that side of the apparatus that is opposite to the supply side of the material.

Filter comprising two parallely disposed filter disks to which the fluid to be cleaned is supplied through a common supply channel, are known for constructions which can be backwashed and which work without scrapers (U.S. Pat. No. 3,361,263).

According to a preferred embodiment of the invention, each scraper is connected for rotation with a shaft disposed coaxially to a worm carrying off the impurities and connected to a drive means being independent from the drive means for the worm. In such a manner, the scraper elements can be rotated with a speed being different from that of the worm carrying off the impurities so that a better adjustment to the present circumstances can be obtained.

By the feature that within the inventive apparatus both axial directions of the filter apparatus are free for the drive means, there is the possibility within the spirit of the invention for variants with respect to disposal and number of the worms carrying off the impurities. Thus, it is possible within the spirit of the invention, to provide two coaxial worms in two downstream channels which worms carry off the impurities in two opposite directions. However, also all impurities can be carried off towards one side, either by one single worm only or within the spirit of the invention by two worms disposed coaxially within each other in one common downstream channel and conveying the impurities in the same direction towards a common outlet opening of the downstream channel.

For the construction of the single scraper elements, there are two particularly advantages variants within the spirit of the invention: On the one hand, according to the invention the scraper elements may be formed by sheet metal angle pieces that with always one leg are fixed to a common scraper carrier member and with the other leg constituting the scraper edge resiliently engaging the filter disk. On the other hand, a particular favourable embodiment of the invention consists in that each scraper element is fixed by means of at least two pins to a scraper carrier member, the pins engaging associated bores with play, each scraper element being provided on its side facing the filter disk with a protruding scraping ledge. These pins may either be clamped within the scraper element or within the scraper carrier member, the associated bores being disposed in the respective other member. In each case, the scraper elements cannot slide off the pins because they engage the filter disks. To the contrary, the scraper elements are automatically pressed against the filter disks by the pressure of the material to be filtered without that therefor separate springs are necessary. The protruding scraper ledge, namely, has as a consequence that the remaining surface of the scraper element facing the filter disk is smaller than the opposing surface of the scraper element. The high pressure of the supplied medium to be filtered, therefore, presses each scraper element towards the neighbouring filter disk, as long as the pressure of the material to be filtered is retained. Within this, it is of advantage that these circumstances remain substantially unchanged over the life of the respective scraper element. Even if namely the scraper ledge wears by and by, the scraper element is still pressed by the pressure of the material to be filtered towards the filter disk as long scraper ledge sufficiently protrudes from the neighbouring surface portion of the scraper element.

As already mentioned, the requirement to reliably convey the impurities scraped off the filter disks and conveyed towards their center, is the more important, the greater the throughput of the filter apparatus is. Mostly the impurities constitute a comparatively compact mass which sometimes contains also bigger foreign bodies, for example wire pieces, that may clamp between the filter disk and the scraper element and, therefore, may impede the rotation of the scraper. Furthermore, considerable shearing forces appear at greater throughputs or, respectively, filter disks of great area, which forces must be overcome when rotating the scraper, what requires a high power for the drive, that, what is more, is frequently not constant, but shows uncontrollable peaks in dependency from the kind, size and frequency of the impurities. Furthermore, it happens again and again, that the plasticizing device preceding the filter apparatus delivers portions of the material that are only partially plasticized, what also causes increased shearing forces. In order to overcome also these difficulties, according to a further embodiment of the invention the construction is so chosen that a scraper carrier member carrying the scraper elements is provided with recesses extending from its periphery and, respectively, or with openings disposed between the scraper elements, the edges of these recesses or openings being at least in sections provided with cutters acting on the supplied material. On the one hand, these recesses or, respectively, openings constitute free spaces of the scraper carrier member, so that the shearing forces acting on the synthetic plastics material or other material to be filtered, are decreased. On the other hand, the cutters disposed at the edges of these recesses or, respectively, openings, at the same time comminute bigger impurities, and this already immediately after the moment at which these impurities are supplied from the upstream channel into the periphery region of the respective filter disk. The more these impurities are comminuted, the easier the scraper carrier member can be rotated and the easier the comminuted impurities can be conveyed towards the center of the respective filter disk, where they reach the downstream channel and are conveyed off. This substantially contributes to a lengthening of the intervals of the filter exchange, in particular for mineral or metallic impurities, because bigger, hard, sharp-edged impurities may scratch the filter surface when being conveyed along the area of the filter disk towards the output worm. This danger is the less, the finer these bigger impurities are comminuted, because comparatively small particles of the impurities can easier accommodate between neighbouring scraper elements than bigger particles.

BRIEF DESCRIPTION OF THE DRAWINGS

Further features and advantages of the present invention can be taken from the description of examplative embodiments schematically shown in the drawings.

FIG. 3 shows a second embodiment section.

FIG. 4 shows a detail in section along the line IV—IV of FIG. 3.

FIG. 5 is a section along the line V—V of FIG. 4.

FIGS. 6 to 9 each show a further embodiment in section similar to FIG. 1 or, respectively, FIG. 3.

FIG. 10 shows the scraper carrier member of the embodiment according to FIG. 9 in a side view.

FIGS. 11, 12 and 13 are sections taken along the lines XI—XI or, respectively, XII—XII or, respectively, XIII—XIII of FIG. 10, always in an enlarged scale.

FIG. 14 shows a detail of FIG. 13 after a longer running time.

FIG. 15 shows a view in direction of the arrow XV of FIG. 10 in an enlarged scale and FIG. 16 shows the fixing of a scraper element in axonometric view, partially in section.

DETAILED DESCRIPTION OF THE INVENTION

Figures 1, 2:
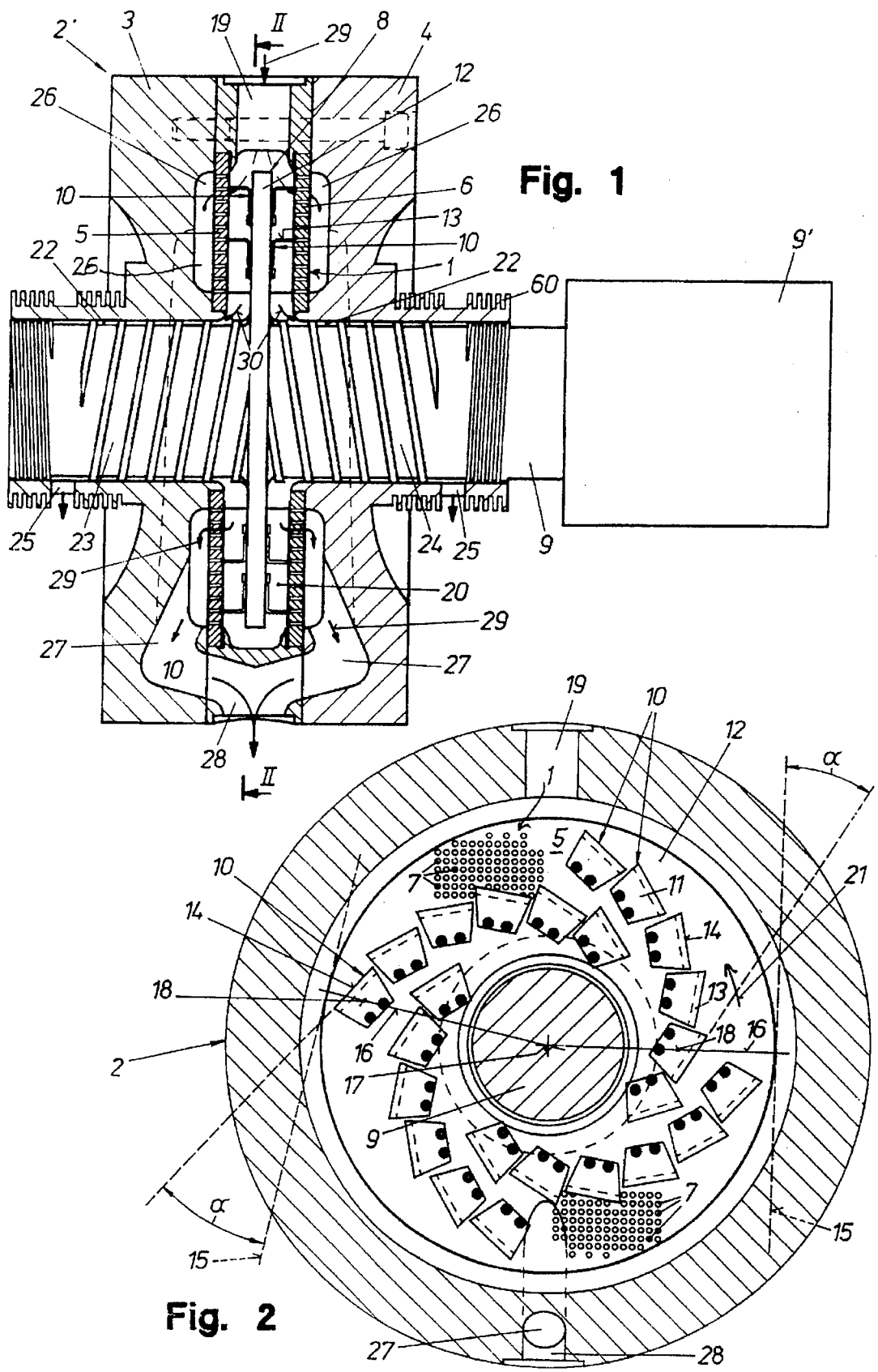
FIG. 1 shows a first embodiment in section through the axis of the output worm.
FIG. 2 is a section taken along the line II—II of FIG. 1.

Within the embodiment according to FIGS. 1 and 2, the filter apparatus comprises a housing 2 consisting of two members 3,4 separable from each other, which member are screwed so that the members positioned within the interior of the housing 2 can easily be assembled or, respectively, disassembled. These inner members comprise substantially a filter 1 in form of two filter disks 5,6, fixed in parallel and spaced apart from each other to the two housing members 3,4, for example screwed thereto. Each filter disk 5,6 is formed as a circular ring disk and has a plurality of filter openings 7 (FIG. 2) for the filtered material. A scraper 8 is positioned between the two filter elements 5,6 and comprises a scraper carrier member 12 in form of a circular ring, disk mounted on a worm shaft 9 and connected for common rotation thereto. The worm shaft 9 is driven for rotation by a drive means 9' of any construction, preferably with variable speed of rotation. A plurality of segment-like scraper elements 10 is positioned on each side of the disk-shaped scraper carrier member 12, each one of these elements consisting of a sheet metal angle, the one leg 11 thereof being screwed to the plate of the scraper carrier member 12. The other leg 13 of each scraper element 10 protrudes from the plane of the scraper carrier member 12, for example perpendicularly thereto, and constitutes with its end facing the respective filter disk 5 or 6 a scraping edge 14 that resiliently engages the respective filter disk 5,6. The single scraper elements 10 are screwed to the scraper carrier member 12 along spiral shaped lines so that the straight-lined scraping edges 14 include an angle α with the respective associated tangent 15 (FIG. 2), which angle is different from zero. The respective associated tangent 15 is that tangent to the circular-shaped periphery of the scraper carrier member 12 that belongs to the radius 16 which connects the center 17 of the scraper 8 with the center 18 of the respective scraper element 10 (FIG. 2). As it is shown in FIG. 2, this angle α is not constant, however it is the greater, the more the respective scraper element 10 neighbours the center 17.

The fluid to be filtered, as a rule a thermoplastic synthetic plastics material melt, is supplied into the housing 2 via an upstream channel 19 merging radially with respect to the axis of the shaft 9 into the center region of the space 20 between the two filter disks 5,6. The scraper 8 rotates within this space 20 in direction of the arrow 21 (FIG. 2), so that the impurities of the supplied synthetic plastics material melt, which cannot pass the filter openings 7 and, therefore, remain at the side of the respective filter disk 5,6 facing the scraper 8, are conveyed by the scraping edges 14 of the scraper elements 10 by and by in the space 20 towards the center 17. The innermost scraper elements 10 extend with their scraping edges 14 merely up to two conveyance channels 22 disposed coaxially with the axis of the shaft 9, which channels 22 are connected on their side facing the scraper 8 to the space 20, and in each channel there is disposed a worm 23,24 formed by worm threads on the shaft 9. The thread pitches of the two worms 23,24 are directed opposite to each other, so that the two worms 23,24 take up the impurities supplied from the space 20 and convey them within the respective conveyance channel 22 towards an outlet opening 25, where the impurities leave the housing 2, all that provided that the direction of rotation of the shaft 9 is suitably chosen. Collecting receptacles or the like may be connected to these openings 25.

The clean synthetic plastics material melt that has passed the filter openings 7 of the respective filter disk 5,6, reaches a collection space 26 disposed at the other side of the filter disks 5,6, which space extends behind the respective filter disk 5,6 over the entire area thereof that shows filter openings 7 and in annular form surrounds the worm shaft 9. At the side of the housing 2 that does not face the upstream channel 19, the collection space 26 is connected to two connection channels 27 that lead to a common downstream channel 28 directed radially to the worm shaft 9, through which downstream channel the cleaned melt leaves the housing 2. A suitable tool, for example an extruder head or a mold, may be connected to this downstream channel 28.

The direction of the melt streaming in the channels 19,27,28 or in the space 20 and in the collection spaces 26 is indicated by arrows 29, the direction of the impurities entering the two conveyance channels 22 from the central space 20 by arrows 30. As it can be seen, the synthetic plastics melt streams substantially in a direction through the housing 2 extending perpendicularly to the axial direction of the worm shaft 9. By this, both ends of the worm shaft 9 are free for positioning the drive means 9'. If desired, some upstream channels 19 and, respectively, or some downstream channels 28 may be provided, preferably disposed in a star configuration with respect to the axis of the worm shaft 9.

The space 20 confined by the two filter disks 5,6, in which the scraper 8 rotates, is tightly closed with the exception of the upstream channel 19 and the downstream channel 28 as well as the filter openings 7 for the filtered material, so that losses of the material to be filtered or of the filtered material are avoided and it is also reliably avoided that not filtered material can reach the space behind the filter disk 5,6. Since the sheet metal angles that constitute the scraper elements 10 resiliently engage the filter disks 5,6, the scraping action necessary for conveying off the impurities is always ensured, even if the filter disks 5,6 are bent by the pressure of the material to be filtered supplied via the upstream channel 19. This bending can be decreased by providing perforated abutting plates disposed behind the filter disks 5,6, seen in streaming direction of the filtered material. As a rule, the diameter of the openings of this abuttment plate is substantially greater than the diameter of the very fine filter openings 9.

The embodiment according to FIGS. 3 to 5 differs from that according to FIGS. 1,2 substantially in that conveying off the impurities scraped off by the scraper 8 from the two filter disks 5,6 and conveyed towards the center of the scraper 8, is made by one single worm 23 towards one single outlet opening 25 extending from the housing 31 of the worm 23 downwardly to the environments or to a collection space for the impurities. The worm housing 31 is laterally flanged to the right housing member 4 by means of screws. A hub 32 of the scraper 8 is connected for common rotation to the front end of the worm shaft 9, the drive means for this shaft being not shown, so that the scraper 8 rotates in common with the worm shaft 9. For reasons of better clearness, the scraper elements 10 are not shown here. They are disposed on the scrapper carrier member 12 in the manner described in connection with the embodiment according FIGS. 1 and 2 and, therefore, operate in an analogous manner. The impurities conveyed towards the hub 32 of the scraper 8 enter from the room 20 immediately the first threads 23' of the worm 23, because these worm threads 23 extend up to the room between the two filter elements 5,6. On the outer periphery of the hub 32, the impurities scraped off the left hand filter disk 5 reach openings 33 formed by perforations, through which the impurities reach the right hand side of the scraper 8 from the left hand side thereof and there are catched by the first threads 23' of the worm 23. Between each two openings 33 a web 34 (FIG. 4) is disposed that forms a conveyor blade for the impurities, so that the impurities are conveyed in the space 20 from let to right (seen in FIG. 3) towards the worm 23. Suitably these conveyor blades 34 are provided with sharp cutters 35 (FIG. 5) acting on the impurities and comminuting them so that the impurities reach the worm 23 in a loosened manner and thereby can easier be taken along. The direction of rotation of the webs 34 is indicated by an arrow 36 in FIG. 5.

The embodiment according to FIG. 6 has also vertically disposed, stationary filter elements 5,6 between which a scraper 8 rotating around the horizontal axis 37 is disposed centrally in the space 20. The impurities scraped off the two filter disks 5,6 are conveyed off through a single outlet opening 25 disposed in the right bottom region of the worm housing 31, however, in contradiction to the embodiment according to FIGS. 3 to 5, the impurities are not conveyed by one single worm 23, but by two worms 23,24 disposed coaxially within each other, both worms conveying towards the outlet opening 25. Within this, the outer worm 23 is substantially so disposed and driven as this is shown in FIG. 3, that means, it reaches with its outermost to the left disposed worm threads into the space 20 and takes along from there the impurities scraped off the right hand filter disk 6. The inner worm 24 is bearingly supported in a bore 38 disposed coaxially to the axis 37 and on its right hand end being in connection with the outlet opening 25. The left hand end of the inner worm 24 protrudes with its last worm threads through a central opening 38 of the scraper 8 into that section of the room 20 that is disposed to the left hand side of the scraper 8, wherefrom this worm 24 conveys the impurities to right towards the outlet opening 25. By means of a flange 40, the shaft 39 of the worm 24 is connected to a not shown drive means for rotation of the worm 24 around the axis 37. The speed of revolution of the worm 24 may, but must not, be equal to that of the worm 23.

Figure 7:
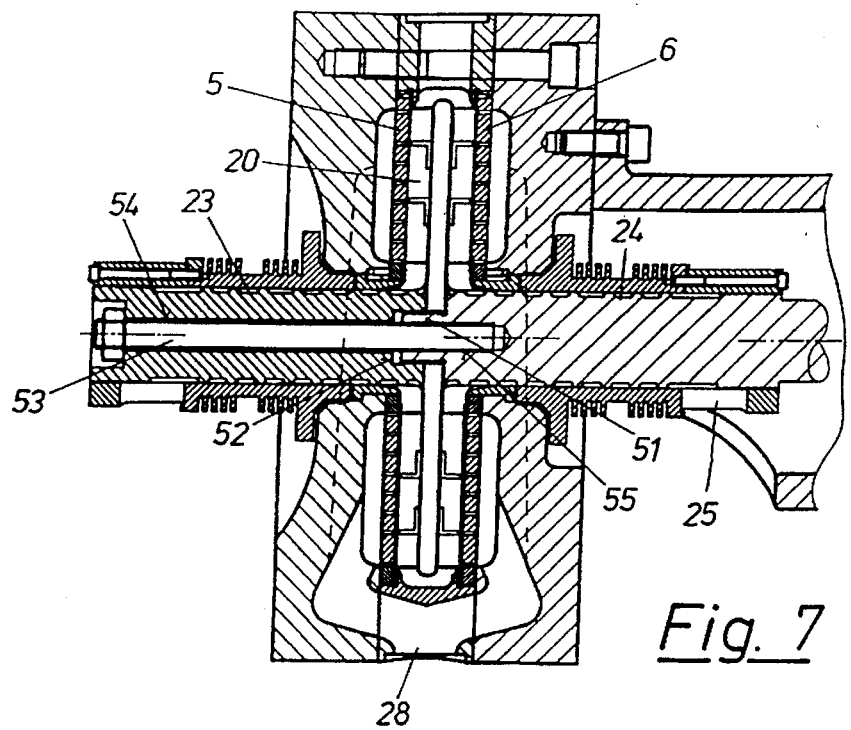
Figure 8:
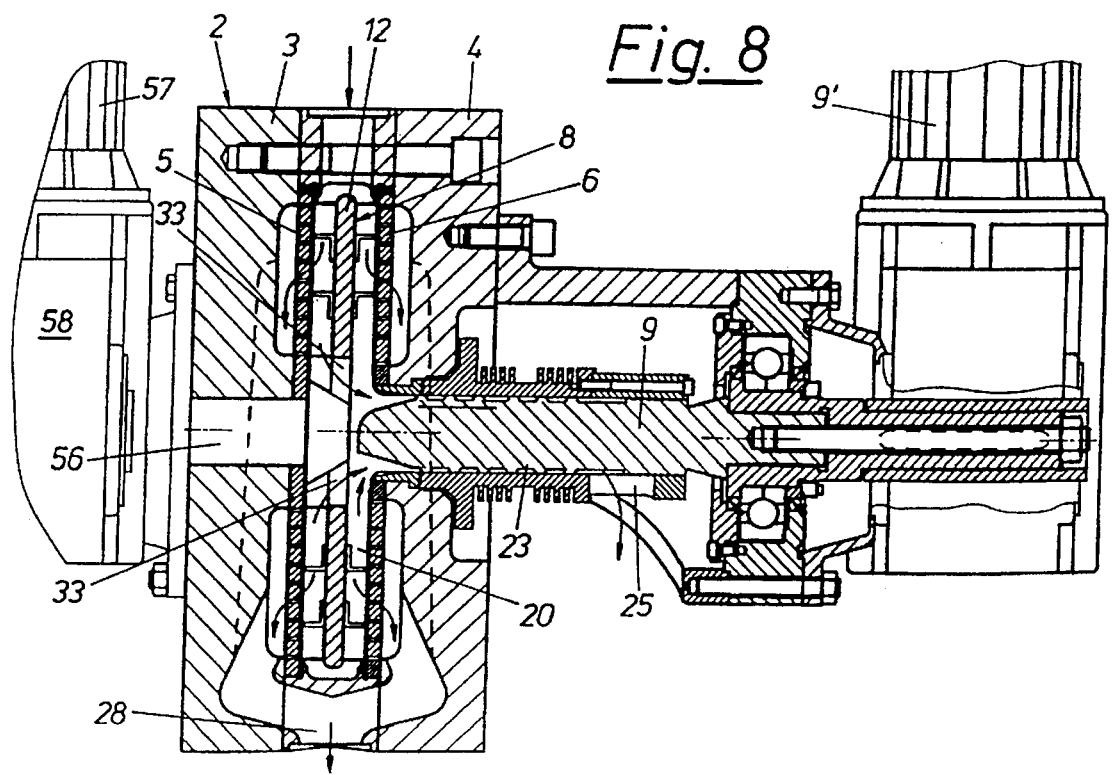

The embodiment according to FIG. 7 is similar to that according to FIG. 1, however, the worm shaft 9 being common for the two worms 23,24 is formed in two parts. That part of the worm shaft 9 that is disposed to right in FIG. 9 and belongs to the worm 24, protrudes with an extension 51 into a corresponding recess 52 of the left worm shaft part. The extension 51 is provided with outer threads screwed into inner threads of the recess 52. Suitably, the pitch of these threads is so chosen that this thread connection tends to fasten when the worm shaft 9 is rotated. In addition thereto, a safety means is formed by a threaded bolt 53 that is inserted through a central bore 54 of the left hand part of the worm shaft and is screwed into a threaded bore 55 on the front end of the right hand worm shaft part. The two worms 23,24 convey the scraped-off impurities to left or, respectively, right from the space 20 disposed between the two filter disks 5,6 towards the two outlet openings 25, The embodimend according to FIG. 8 is similar to that of FIG. 3 insofar as the impurities scraped off the filter disks 5,6 by the scraper elements 10 are conveyed by one single worm 23 towards an outlet opening 25 disposed laterally to the right side of the two filter disks 5,6. As within the embodiment according to FIG. 3, also within the embodiment according to FIG. 8, the scraper carrier member 12 is provided with openings 33 disposed along a circle around its center so that the impurities loosened from the left hand filter element 5 may reach the right hand side of the space 20 and, therefore, the threads of the worm 23. Differing form the embodiment to FIG. 3, however, the scraper 8 is not connected for rotation to the shaft 9 of the worm 23, but to a shaft 56 extending towards the left from the housing 2, which shaft is driven by a separate drive means 57 via a control gear means 58. In this manner the scraper 8 and the worm 23 serving for conveying off the impurities may be driven with different speeds of revolution, each one of these speeds preferably being adjustable at choice. Thereby it is possible to optimally meet different properties of the material to be treated.

It is also suitable for such an adaptation to keep the temperature of the worm housing 31 at a desired value. For this, a heating 59 (FIG. 3), preferably in form of a heater winding, and, respectively, or a cooling device 60 (FIG. 1), for example in form of cooling ribs, cooling spirals or the like, each may be disposed on the worm housing 31. Thereby, the amount of the impurity—output may be influenced in dependency from the temperature.

As already mentioned, within all embodiments it is suitable to connect the filter disks 5,6 on their outer periphery or, respectively, inwardly in the center region so tightly to the members carrying same that the supplied fluid cannot by by-passing the respective filter element reach the space 20 or 26 disposed behind same. Suitable clampings or fastenings of the filter disks 5,6 to the said members are shown in the several exemplative embodiments.

Within all embodiments it is suitable to construct the filter disks 5,6 of the filter 1 so that filter screens formed by apertured sheet metal 95 (FIG. 3) are abutted by perforated abutment plates 96. The apertures of the apertured sheet metals 95, of course, are very fine so that its manufacture suitably is made by drilling apparatus using laser beams or electrone beams. Suitably, these fine apertures are conically formed, and this having the greater diameter at the side facing the perforated abutment plate 96.

A drain cock for the impurities or a drain line provided with a separately driven conveyor worm for the impurities may be connected to the outlet opening 25.

As a rule it is favourable to form the filter disks 5,6 as annular disks because in such a manner the worm conveying off the impurities can be disposed with its worm threads extending into the opening of the annular disk. If desired, however, it is also possible to form single filter disks as full circular disks, as this is shown for example in FIG. 5 for the filter disk 5. Such an embodiment is also possible for example for the left hand filter disk 5 in FIG. 3, and of course then the scraping edges 14 of the scraper 8 facing that filter disk 5 should reach up to the central region of the filter disk 5. Within the region of the openings 33, the scraper elements 10 may be carried by the webs 34.

As already mentioned, the filter 1 and the scraper 8 must not absolutely be formed by planar disks, even this is suitable for reasons of an easier manufacture and assembling, particular if two or more filters disposed parallel to each other are provided. However, the filter disks 5,6 may also be shaped slightly cone-shaped or conoidal, and then the shape of the scraper carrier member 12 or, respectively, the position of the scraping edges 14 must correspondingly be adapted. However, such a cone-shape or conoidal shape should not differ from a plane for more than 5°, in particular it should amount to less than 3°. This means that the aperture angle of the cone or, respectively, of the conoidal shape should at least amount to 170°, in particular at least to 174°.

The embodiment according to FIGS. 9 to 16 is similar to that of FIG. 5, however, the scraper carrier member 12 and the scraper elements 10 are constructed different to those of FIG. 5. As this was already the case in a similar manner within the embodiment according to FIG. 5, the edges 33' of the openings 33 are disposed obliquely with respect to the horizontal axis of the filter apparatus (FIG. 11) so that the sharp edges 35 of the openings 33 cut the impurities when the plate-shaped scraper carrier member 12 is rotated in direction of the arrow 21, and also convey the impurities towards the right (seen in FIG. 9), therefore towards the worm 23, by the obliquely disposed edges 33'. As already mentioned, the impurities, however, sometimes contain bigger elements, in particular small stones or metallic particles, for example staples or wire-pieces. In order to comminute these components of the impurities already within the inlet region of the filter apparatus, therefore, already before these components of the impurities reach the filter disks 5,6, the scraper carrier member 12 is provided on its periphery 81 with knives 88 (FIG. 10, 15) acting on the material to be filtered and supplied through the upstream channel 19. The cutting edges 89 of these knives 88 extend parallel to the axis of rotation 90 (FIG. 10) of the scraper 8 and protrude over the two planar lateral surfaces 91 (FIG. 15) extending perpendicularly to this axis 90, however not beyond the effective surfaces 92 of the scraper element 10. The cutting edges 89 may also slightly protrude beyond the periphery 81 of the scraper 8, in particular if the upstream channel 19 merges into an annular groove 62 surrounding the periphery of the scraper 8, which groove, so to speak, constitutes an outer enlargement of the space 20. During the rotation of the scraper 8 in direction of the arrow 21 (FIG. 10), these bigger or rigid components of the impurities are caught by the cutting edges 89 of the knives 88 and are comminuted to at least some extent. Each knife 88 is abutted in a gap 63 (FIG. 10) extending inwardly from the periphery 61 of the scraper 8 and is secured by a pin 64.

However, the scraper carrier member 12 carries also other elements contributing to comminute components of the solid particles of the impurities. For this, the plate of the scraper carrier member 12 is provided in addition to the openings 33 with recesses 65 extending inwardly from its periphery 61, each of which recesses 65 being disposed between two rows of the scraper elements 10. At least in some sections, the edges 66 of these recesses 65 are provided with cutters 67 (FIG. 12). In particular, such sections are the bottom 66' of the recesses 65 as well as those lateral edges 66" (FIG. 10), which follow, when seen in direction 21 of rotation of the scraper 8. Within this, the cutters 67 are centrally disposed with respect to the thickness of the plate of the scraper 8 and generally are so formed that they do not exert a conveying action in direction of the axis 90 onto the impurities. However, in special cases it may be desired to design these cutters 67 similar to the cutters 35 of the openings 33, thus having a conveying action in direction of the axis 90.

In a similar manner, as this has been described for the recesses 65, also additional openings 68 of the plate of the scraper 8 are provided with cutters 69 acting on the supplied material, in particular onto bigger particles of the impurities of this material. These cutters 69 (FIG. 12) are disposed particularly at such sections 70' or, respectively, 70" of the edges 70 of the openings 68 which follow, when seen in direction 21 of rotation of the scraper 8. When seen in direction of the axis 90, these openings 68 have about the shape of a pear, the broader side of the opening being disposed in front, when seen in direction 21 of rotation. The narrower side, provided with the cutting sections 70', is disposed at the rear. Thereby, a drawing cut of the cutters 69 of the sections 70' and 70" onto the impurities to be comminuted is obtained.

The openings 68 are disposed always beween two lines of the scraper elements 10 that extend curved towards that area of the plate of the scraper 8 that neighbours the axis. It is suitable to dimension the openings 33, and the recesses 65 extending from the periphery of the scraper 8, and the openings 68 as large as possible. The remaining webs (FIG. 10) of the plate of the scraper 8 must only be so rigid as it is required by solidity reason with respect to the shearing forces to be overcome and with respect to the applied torque resulting therefrom.

In order to scrap off the impurities by the scraping action exerted by the scraper 8 onto the filter disks 5,6, a plurality scraper elements 10 are provided which are fixed to the plate of the scraper carrier member 12 following curved lines, for example having spiral shape, and this by means of two pins 72 per scraper element 10 (FIGS. 10,13,14). The axes of the pins 72 extend parallel to each other for each scraper element 10. These pins 72 are clamped in the plate of the scraper carrier member 12 and extend with play into bores 73 of the scraper elements 10. Since the scraper elements 10 engage the filter disks 5 or 6 (FIG. 13), the scraper elements 10 cannot slide off the pins 72. On the contrary, the scraper elements 10 are pressed against the filter disks 5,6. This could be done by intermediately positioned springs, however, the shape of the scraper elements 10 shown in FIGS. 13,14 and 16 makes such springs to be superflous. According to FIGS. 13 and 16, the surface 74 each scraper element 10 facing the scraper carrier member 12 is planar, however, the surface facing the respective filter disk 5 or 6 is provided with a recess 75 in such a manner that a ledge 76 engaging the filter disk 5 or 6 is formed, which ledge extends in longitudinal direction of the scraper element 10 and produces the scraping action with its sharp, preceding edge 77. That area on the recess 75, that faces the respective filter disk 5 or 6 and is in contact with the material to be filtered, is, therefore, smaller than the opposing surface 74 of the scraper element 10. The forces exerted from the pressurized material to be filtered, that is supplied via the upstream channel 19, on the area 74 and the recess 75, therefore, are of different amount, and, more particularly, the force acting on the surface 74 is greater than the force excerted on the filter element 10 via the recess 75. Thereby, each filter element is the more pressed by the supplied material to be filtered against the apertured sheet metal 95 of the neighbouring filter disk 5,6, the greater the pressure of the supplied material to be filtered is. The mentioned construction of the scraper ledge 76 causes that these circumstances remain practically unchanged over the life of the respective scraper element 10. Namely, even if the scraper ledge 76 is worn out, the said size relations of the surfaces 74,75 impinged by the pressure of the supplied material remain unchanged (FIG. 14) and also substantially unchanged remains the scraping action ex erred by the scraper ledge 76, even if after high wear this scraper ledge 76 shows a small height only (FIG. 14).

For reasons of manufacture, the scraper ledge 76 passes into the recess 75 over a small hollow surface portion 78. This hollow surface portion 78, however, does not change the described circumstances.

Suitably, the scraper ledge 76 is disposed at the preceding side of the respective scraper element 10 with respect to the direction of revolution of the scraper carrier member 12 (arrow 21, FIGS. 13,14), in order to avoid that impurities can gather in the free space 79 formed between the recess 75 and the respective filter disk 5 or 6, whereby the said pressing of the scraper element 10 to the filter disks 5 or 6 could be adversely affected. The surface portion 80 following the hollow surface portion 78 and limiting the recess 75 of the scraper element 10, is suitably even.

The scraper carrier member 12 must not be a plate in its narrow sense. However, it is possible, for example, to form the scraper carrier member 12 as a bar construction or framing, composed of elements, which carries the scraper elements 10 in the described manner. Then, the single elements of the bar construction of frame work confine the openings 33 or, respectively, the openings 68 or, respectively, the recesses 65.

The bearing of the worm 23 and of the shaft driving it, is suitably positioned within a structure 81 that is attached to the housing 2, and also the worm housing 31 constitutes a member being separate from the housing member 4 and being screwed thereto, for easy assembling or disassembling of the worm. The worm housing 1 may carry temperature control devices 83, for example a heating and/or a cooling means, so that the impurities carried off by the worm 23 can be kept at the desired temperature. In order to mount these temperature control devices 83 as close to the location at which impurities are caught by the worm 23, the housing member 4 is provided with a hollow 84.

Although the present invention is particularly suitable for filtering thermoplastic synthetics material melts, also filtering of other materials containing impurities is possible, for example filtering of fruit juices, edible oils and the like.

What is claimed is:

1. Filter apparatus for liquids, with continuous cleaning of the surface of the filter, comprising a housing (2) for a stationary, metallic, substantially planar filter (1), to which the liquid to be filtered is supplied through at least one upstream channel (19) and from which the cleaned liquid is conducted off the housing (2) through at least one downstream channel (28), at least one scraper (8) provided with some scraping edges (14) lying in a common plane and following curved lines, at least one drive means (9') for rotation of the scraper so that the scraper (8) strokes over the upstream surface of the filter (1) and thereby strips off the impurities adhering thereon and carries them towards the center of the filter (1), wherefrom the impurities are conveyed off by at least one worm (23,24) through at least one conveyance channel (22) extending from the center of the filter and leading out of the housing (2), the filter (1) being constituted by at least two filter disks (5,6) disposed in parallel to each other and spaced apart from each other, that the liquid is supplied through the upstream channel (19) at the outer periphery of the filter disks (5,6), the scraper (6) acting upon both filter disks (5,6) being disposed between the filter disks, each of the scraping edges (14) of the scraper being formed by scraper elements (10) separated from each other but disposed along the lines and being pressed onto the filter disks (5,6), and that collection spaces (26) for the cleaned liquid are provided at the opposing side of the filter disks (5,6), which collection spaces are connected with the downstream channel (28) in the region of the outer periphery of the filter disks (5,6).

2. Filter apparatus according to claim 1, each scraper (8) being connected for rotation with a shaft (56) disposed coaxially to a worm (23) for carrying off the impurities, said shaft being connected to a drive means (57) being independent from the worm drive means (9').

3. Filter apparatus according to claim 1, two coaxial worms (23,24) being provided which carry off the impurities in two opposite directions.

4. Filter apparatus according to claim 1, two worms (23,24) being disposed coaxially within each other in one common conveyance channel (22) for conveying the impurities in the same direction towards a common outlet opening (25) of the conveyance channel (22).

5. Filter apparatus according to claim 1, at least one scraper (8) being provided with at least one opening (33) for the impurities disposed in its central region.

6. Filter apparatus according to claim 5, at least one conveyer blade (34) for the impurities being disposed in the opening (33).

7. Filter apparatus according to claim 6, the conveyor blade (34) being provided with sharp edges (35) acting on the impurities.

8. Filter apparatus according to claim 1, at least one filter disk (5,6) being formed as an apertured sheet metal (95) having fine apertures that is abutted by an abutment plate (96) having openings.

9. Filter apparatus according to claim 8, the apertured sheet metal (95) having fine bores which are conically shaped and enlarge towards the abutment plate.

10. Filter apparatus according to claim at least one conveyance channel (22) for the impurities being provided with at least one of a heating device and a cooling device.

11. Filter apparatus according to claim 1, at least one filter disk (5,6) being conically shaped, the angle of inclination with respect to a planar surface amounting to not more than 5°.

12. Filter apparatus according to claim 1, the scraping edges (14) extending along spiral lines towards the central region of the scraper (8).

13. Filter apparatus according to claim 1, the scraper elements (10) being formed by sheet metal angles that are connected with one leg (11) each to a common scraper carrier member (12) and with another leg (13) forming the scraping edge (14) resiliently engaging the filter disk (5,6).

14. Filter apparatus according to claim 1, each scraper element (10) being connected by at least two pins (72) to a scraper carrier member (12), the pins (72) being inserted into associated bores (73) with play, and that each scraper element (10) on its side facing the filter disk (5 or 6) being provided with a protruding scraper ledge (69).

15. Filter apparatus according to claim 14, the scraper ledge (76) being disposed at the preceding side of the scraper element (10).

16. Filter apparatus according to claim 14, the scraper ledge (76) verging by a rounded hollow surface portion (78) into a planar surface portion (80) of the scraper element (10), that faces the filter disk (5 or 6).

17. Filter apparatus according to claim 1, a scraper carrier member (12) carrying the scraper elements (10) being provided with recesses (65) extending from its periphery (61) and disposed between the scraper elements (10), the edges (66) of these recesses (65) being provided at least along sections with cutters (67) acting on the supplied material.

18. Filter apparatus according to claim 17, the scraper carrier member (12) being provided with additional openings (68) between the recesses (65) and with at least one opening (33) disposed in a region neighboring the axis, these openings (68) being provided with cutters (69) acting on the material at least on those sections (70',70") of their edges (70) that follow, when seen in direction of rotation of the scraper carrier member (12).

19. Filter apparatus according to claim 18, when seen in direction of rotation of the scraper carrier member (12), the openings (68) at their front being wider than at their rear, the narrower, rear side being provided with cutters (69).

20. Filter apparatus according to claim 18, the openings (68) being disposed between two rows of the scraper element each, said rows being curved and extending towards the area of the scraper carrier member (12) neighboring the axis.

21. Filter apparatus according to claim 18, the webs (21) remaining between neighboring recesses (65) carrying on their outer edges knives acting on the material, the cutters (85) protruding laterally beyond its surface (86), but stand back with respect to the scraper elements (10).

* * * * *

UNITED STATES PATENT AND TRADEMARK OFFICE
CERTIFICATE OF CORRECTION

PATENT NO. : 5,643,450
DATED      : July 1, 1997
INVENTOR(S): BACHER, Helmut et al It is certified that error appears in the above-identified patent and that said Letters Patent is hereby corrected as shown below:

On the title page, item [30], under
Foreign Application Priority Data

The country of origin of the priority applications should read "Austria" and not "Australia"

Signed and Sealed this

Twenty-fifth Day of November, 1997

Attest:

BRUCE LEHMAN

*Attesting Officer*          *Commissioner of Patents and Trademarks*